United States Patent
Jul et al.

(10) Patent No.: US 9,891,941 B2
(45) Date of Patent: Feb. 13, 2018

(54) METHOD FOR BALANCING A LOAD, A SYSTEM, AN ELASTICITY MANAGER AND A COMPUTER PROGRAM PRODUCT

(71) Applicant: Alcatel-Lucent, Boulogne-Billancourt (FR)

(72) Inventors: Eric Jul, London (GB); Davide Cherubini, Reading (GB); Tommaso Cucinotta, Dublin (IE); Diego Lugones, London (GB)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/819,940

(22) Filed: Aug. 6, 2015

(65) Prior Publication Data

US 2016/0055025 A1 Feb. 25, 2016

(30) Foreign Application Priority Data

Aug. 20, 2014 (EP) .................................. 14306301

(51) Int. Cl.
G06F 9/455 (2006.01)
G06F 9/48 (2006.01)
G06F 9/50 (2006.01)

(52) U.S. Cl.
CPC ........ *G06F 9/45558* (2013.01); *G06F 9/4856* (2013.01); *G06F 9/5083* (2013.01); *G06F 2009/4557* (2013.01)

(58) Field of Classification Search
None
See application file for complete search history.

(56) References Cited

U.S. PATENT DOCUMENTS

2006/0095582 A1* 5/2006 Nitya .................. H04W 28/065
709/236
2010/0228819 A1* 9/2010 Wei ........................ G06F 9/505
709/203

(Continued)

FOREIGN PATENT DOCUMENTS

| EP | 2624138 A2 | 8/2013 |
| JP | 2013156996 A | 8/2013 |
| JP | 5632493 B2 | 11/2014 |

OTHER PUBLICATIONS

Extended European Search Report dated Jun. 11, 2015 and issued in Application No. 14306301.4.

*Primary Examiner* — Emerson Puente
*Assistant Examiner* — Zhi Chen
(74) *Attorney, Agent, or Firm* — Harness, Dickey & Pierce, P.L.C.

(57) ABSTRACT

A method, in a virtualized system, for balancing a load across multiple virtual machines instantiated over physical hardware of the system, including vertically scaling the capacity of respective ones of the VMs up to a physical capacity limit, $L_{PHY}$, from an initially allocated physical capacity, $L_{VIRT}$, by providing access to additional resources of the physical hardware in response to an increased load causing the or each VM to reach or exceed a threshold capacity $L_{T1}$, and horizontally scaling the capacity of the system by supplementing the multiple VMs with an additional VM instantiated using a hypervisor of the system when a predefined proportion, $U_1$, of the VMs have a capacity $L_{PHY}$.

14 Claims, 4 Drawing Sheets

(56) References Cited

U.S. PATENT DOCUMENTS

| | | |
|---|---|---|
| 2011/0213886 A1 | 9/2011 | Kelkar et al. |
| 2013/0198319 A1 | 8/2013 | Shen et al. |
| 2013/0326506 A1 | 12/2013 | McGrath et al. |
| 2013/0346969 A1 | 12/2013 | Shanmuganathan et al. |
| 2014/0007097 A1* | 1/2014 | Chin .................. G06F 9/45533 718/1 |
| 2014/0058871 A1* | 2/2014 | Marr .................. G06F 9/45533 705/26.1 |
| 2014/0089917 A1 | 3/2014 | Attalla et al. |
| 2014/0115578 A1* | 4/2014 | Cooper ............... H04L 63/1416 718/1 |
| 2014/0359226 A1* | 12/2014 | Pan .................... G06F 12/0873 711/135 |
| 2015/0081916 A1 | 3/2015 | McGrath et al. |
| 2015/0154428 A1* | 6/2015 | Pantaloni ........... G06K 7/10178 340/10.1 |
| 2015/0234670 A1* | 8/2015 | Shimogawa ........ G06F 9/45533 718/1 |

* cited by examiner

METHOD FOR BALANCING A LOAD, A SYSTEM, AN ELASTICITY MANAGER AND A COMPUTER PROGRAM PRODUCT

TECHNICAL FIELD

Aspects relate, in general, to a method for balancing a load, a system, an elasticity manager and a computer program product.

BACKGROUND

In scalable computing environments, such as cloud data centers, which are also known as virtualized systems, applications can be executed in execution environments such as virtual machines that are executed on or over or using physical hardware. Multiple virtual machine instances can be provided, each running the same or different applications or application parts, and the environment can scale the number of virtual machines that are running in order to cope with demand from users for the applications in question.

For example, for a given application, the number of virtual machine instances executing the application can typically be expanded dynamically and elastically so that when load increases another virtual machine instance to service the additional load can be instantiated or spawned. This is called horizontal scalability in that it, virtually, corresponds to adding new machines next to the ones already servicing the load, i.e., expanding horizontally. An application executing in a virtualized system can be composed of multiple parts, each part executing in its own virtual machine.

It typically takes of the order minutes to start up a new virtual machine instance from scratch, and then to load the necessary program modules for an application into it, and thereafter start executing, which can be too long where an increase in load is to be accommodated.

SUMMARY

According to an example, there is provided a method, in a virtualised system, for balancing a load across multiple virtual machines instantiated over physical hardware of the system, comprising vertically scaling the capacity of respective ones of the VMs up to a physical capacity limit, $L_{PHY}$, from an initially allocated physical capacity, $L_{VIRT}$, by providing access to additional resources of the physical hardware in response to an increased load causing the or each VM to reach or exceed a threshold capacity $L_{T1}$, and horizontally scaling the capacity of the system by supplementing the multiple VMs with an additional VM instantiated using a hypervisor of the system when a predefined proportion, $U_1$, of the VMs have a capacity $L_{PHY}$. The load of the system can be re-balanced by distributing the increased load across the vertically scaled virtual machines. The load of the system can be re-balanced by distributing the increased load across the horizontally scaled virtual machines. The physical capacity of a selected VM can be reduced by vertically downscaling the capacity of the selected VM in response to a reduction in the load or horizontal scaling. The selected VM can be the VM with the most unused resources of the multiple VMs and a physical capacity greater than $L_{VIRT}$. The selected VM can be vertically downscaled after load re-balancing of the system. An underutilised VM with the most unused resources of the multiple VMs can be selected, and system requests can be redirected to all other VMs but the underutilised VM, whereby to cause the underutilised VM to become an idle VM, and if necessary, after a predefined time period, any remaining work can be migrated away from the underutilised VM, and the VM can be deactivated or deleted.

According to an example, there is provided a system including multiple virtual machines (VMs) in program execution on physical computing hardware supported by a hypervisor, respective virtual machines to execute multiple applications or application parts, the system including a load balancer to receive incoming requests and to distribute them to selected ones of the virtual machines, an elasticity manager to scale the number of VMs and/or the physical resources available to respective ones of the VMs in response to a change in load on the system and modify the behaviour of the load balancer according to a set of predetermined rules relating to multiple predetermined thresholds for individual and aggregate VM loads. The elasticity manager can vertically scale the capacity of respective ones of the VMs up to a physical capacity limit, $L_{PHY}$, from an initially allocated physical capacity, $L_{VIRT}$, by providing access to additional resources of the physical hardware in response to an increased load causing the or each VM to reach or exceed a threshold capacity $L_{T1}$, and horizontally scale the capacity of the system by supplementing the multiple VMs with an additional VM instantiated using the hypervisor when a predefined proportion, $U_1$, of the VMs have a capacity $L_{PHY}$. The load balancer can re-balance the load of the system by distributing the increased load across the vertically scaled virtual machines. The load balancer can re-balance the load of the system by distributing the increased load across the horizontally scaled virtual machines. The elasticity manager can reduce the physical capacity of a selected VM with a physical capacity greater than $L_{VIRT}$ in response to a reduction in the load or horizontal scaling. The elasticity manager can determine whether a threshold physical limit for the multiple VMs, indicating whether the multiple VMs can be vertically scaled, has been reached.

The elasticity manager can select an underutilised VM with the most unused resources of the multiple VMs, redirect system requests to all other VMs but the underutilised VM, whereby to cause the underutilised VM to become an idle VM, and deactivate or delete the idle VM.

According to an example, there is provided an elasticity manager for use in a virtualised system including multiple virtual machines (VMs) in program execution on physical computing hardware supported by a hypervisor, respective virtual machines operable to execute multiple applications or application parts, the elasticity manager operable to scale the number of VMs and/or the physical resources available to respective ones of the VMs in response to a change in load on the system and modify the behaviour of a load balancer, operable to receive incoming requests and to distribute them to selected ones of the virtual machines, according to a set of predetermined rules relating to multiple predetermined thresholds for individual and aggregate VM loads.

BRIEF DESCRIPTION OF THE DRAWINGS

Embodiments will now be described, by way of example only, with reference to the accompanying drawings, in which.

DESCRIPTION

Figure 1:
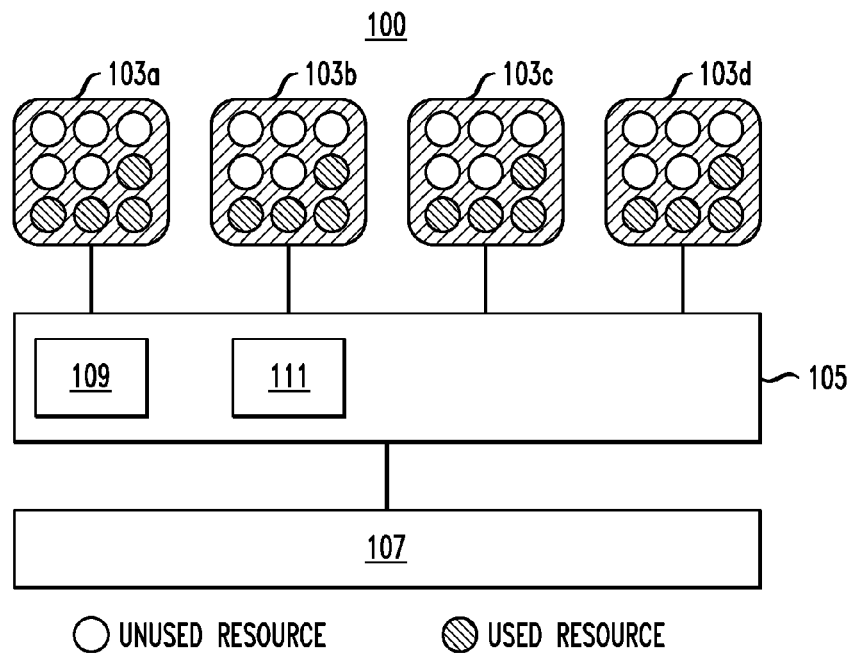
FIG. 1 is a schematic representation of a system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In an example, a virtualized system can be a cloud computing system such as a cloud-based data centre for example, in which multiple virtual machine instances are executing over physical hardware resources of the system by way of a hypervisor or virtual machine monitor (VMM). That is, a hypervisor can instantiate and execute multiple virtual machine instances, and is operable to present operating systems of the virtual machine instances with a virtual operating platform and to manage the execution of the guest operating systems. Multiple instances of a number of potentially different operating systems can share the virtualized hardware resources of the system.

A virtual machine instantiated in a virtualized system can execute an application or part of an application. For example, for an application consisting of N parts, N virtual machine instances can be provided in the system in order to execute the application. Any one or more of the virtual machine instances can be horizontally scaled to provide an additional instance executing the same part of the application.

In general, cloud computing centers employ virtualization, that is, each physical computing node can host a number of virtual processing units called Virtual Machines (VMs), which share the physical resources. Vertical scalability upgrades existing VMs by leveraging hypervisor technologies able to rapidly increase resources on-demand. Vertical scaling of physical capacity of a VM provides good elasticity exactly because resources can be increased very quickly. However, there is a limit ($L_{PHY}$) up to which VMs can be assigned additional resources to process a given workload. This limit is fixed by the physical limitations of the computing node (e.g., server) hosting the VMs, such as maximum processor speed, total physical memory installed in the hardware, or network bandwidth.

Horizontal scaling is based on the provision of adding new VMs to the system. In this case, each new VM instance is assigned a prefixed amount of resources ($L_{VIRT}$) and placed in a computing node, which can be shared by other VMs as long as the resources consumed by all collocated VMs do not exceed the physical limit of the computing node (that is, $\Sigma L_{VIRT} \leq L_{PHY}$).

However, when the workload exceeds the VM prefixed limit ($L_{PHY}$) by a small fraction (say 10% for example) a brand new VM is typically instantiated with a consequent waste of resources due to underutilization of the new VM. Additionally, the instantiation time of VMs (including software installation and configuration) in the horizontal scaling model is typically several orders of magnitude larger when compared to the vertical scaling approach. For example, changing the CPU computational limit for a VM may require as little time as a system call (or a hyper call) needed to reconfigure some parameters of the CPU scheduler within the hypervisor, namely tens of microseconds. On the other hand, creating a new VM may take tens of minutes, due to the need of creating the new VM image, and booting it up, initializing the necessary applications and distributing possibly large amounts of data to it and so on. Thus although horizontal scaling can be used as long as the data center can provide more resources, it is not very elastic because it takes a long time from requesting additional VMs until the VMs are able to contribute to handling the increased load.

According to an example, a method, in a virtualised system, for balancing a load across multiple virtual machines instantiated over physical hardware of the system uses the provision of two-dimensional elasticity using vertical and horizontal scalability along with rebalancing of load according to a set of predefined threshold limits.

When load increases, the capacity of the system is increased by elastically increasing the physical capacity of one or more VMs (vertical scaling), and when vertical distribution nears, reaches or exceeds a threshold, horizontal scaling is implemented to instantiate one or more new VMs. The load is redistributed so as to evenly distribute the load across all VMs, so that each of the VMs has as little load as possible, which, conversely, means that they have a maximum of elasticity to offer to enable a quick scale up in capacity using vertical scaling should an increased load be experienced. That is, room for quickly upscaling vertically when needed is catered for.

According to an example, a system can consist of an application that has one or more components that each execute in a VM, wherein each component can elastically be expanded with more VMs as to increase the capacity of the component in question. A load balancer is provided that receives incoming requests, from users for example, and distributes these requests to the VMs that handle new requests. The load balancer uses whatever policy that the application programmer has specified, e.g., round-robin and so on, but has an overarching purpose to balance the load across the VMs. Such a policy, however, is according to an example, overridden by an elasticity manager that monitors the system and directs the up-scaling and down-scaling of the system and the rebalancing of the load by modifying the behavior of the load balancer. In an example, the load balancer and elasticity manager are static components of the system.

FIG. 1 is a schematic representation of a system according to an example. In the example of FIG. 1, an application starts by creating multiple VMs 103a-d to handle the load. The VMs are controlled using a hypervisor 105 that can apportion physical hardware resources 107 for the VMs. A load balancer 109 and elasticity manager 111 execute within the hypervisor 105. In other examples, these components can be standalone and located in a physically remote location outside of, for example, a data center or virtualized system.

After executing for some time, the load associated with an application or application component is distributed across the VMs 103a-d. In an example, each VM 103a-d is pre-assigned with a prefixed amount of resources ($L_{VIRT}$) from the physical resource 107, of which a certain amount will be in use and the rest is unused as shown in FIG. 1.

When one of the VMs 103a-d nears, reaches or exceeds a capacity threshold, $L_{T1}$, which is less than $L_{VIRT}$, that is some fraction of $L_{VIRT}$, an elasticity process is initiated. The VM in question informs the elasticity manager 111, via hypervisor 105 for example, that the VM has reached or exceeded its $L_{T1}$ threshold. The elasticity manager 111 then evaluates how many of the VMs 103a-d have reached their $L_{T1}$ threshold. If less than some percentage, $P_1$, of the VMs 103a-d have reached their $L_{T1}$ threshold then the elasticity manager 111 directs the load balancer 109 to send less load to the VMs that have reached their threshold, thus pushing load onto the less loaded VMs.

Figure 2:
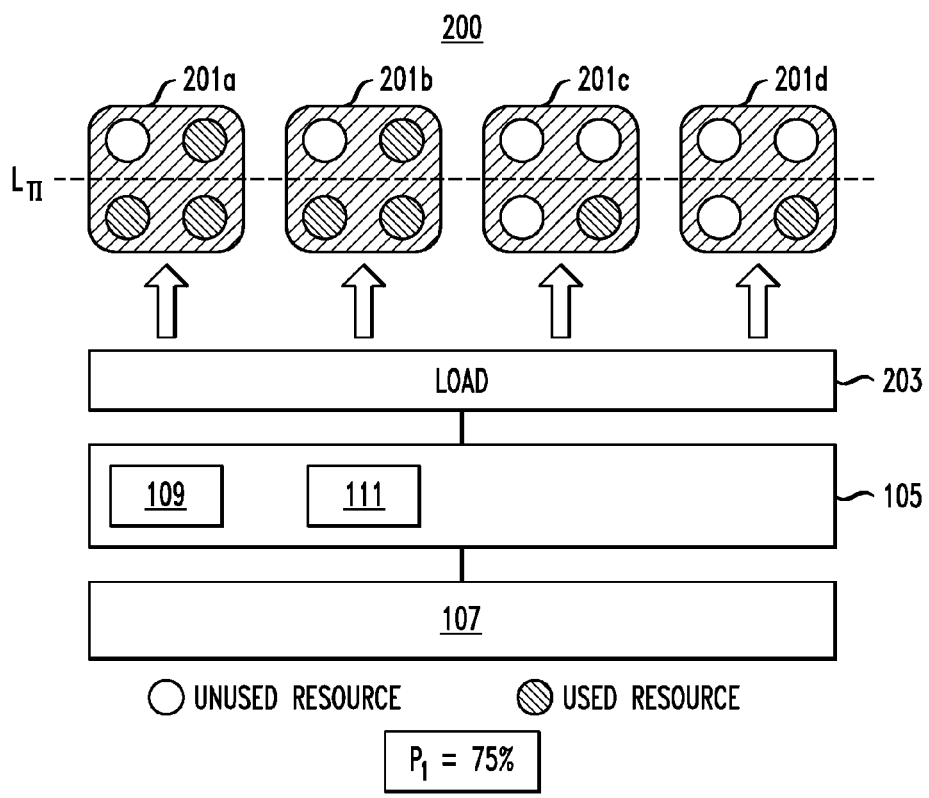
FIG. 2 is a schematic representation of a system according to an example.

FIG. 2 is a schematic representation of a system according to an example. In the example of FIG. 2, four VMs 201a-d are provided. The capacity threshold, $L_{T1}$, for the VMs is set at 50% of the capacity of the VMs. A load 203 is provided, and as can be seen in the example of FIG. 2, VMs 201a and 201b have a capacity that exceeds the capacity threshold. In the example of FIG. 2, P1 is set to 75%. That is, if less than 75% of the VMs in the system 200 of FIG. 2d have reached their $L_{T1}$ threshold then the elasticity manager 211 directs the load balancer 209 to send less load to the VMs that have reached their threshold, thus pushing load onto the less loaded VMs.

Figure 3:
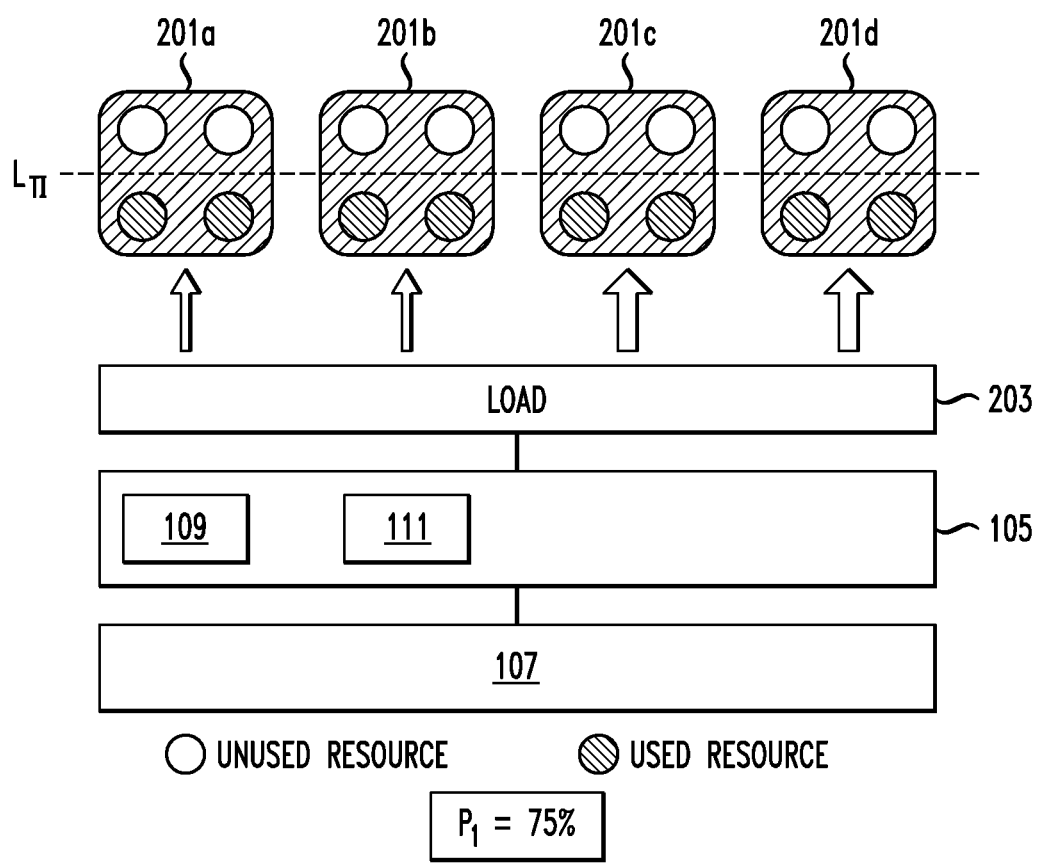
FIG. 3 is schematic representation of the system of FIG. 2 following re-balancing of the load.

This is illustrated in FIG. 3, which is schematic representation of the system of FIG. 2 following re-balancing of the load. As can be seen with reference to FIGS. 2 and 3, proportion of the load distributed to the VMs is reduced for VMs 201a and 201b in FIG. 3, as shown using the relative thickness of the arrows from load 203 to the VMs.

If more than some percentage, $P_1$, of the VMs have reached their $L_{T1}$ threshold and more than a predefined percentage, $U_1$, of the VMs have reached their $L_{PHY}$ limit, then the total load for all VMs is approaching the physical limit and, according to an example, horizontal scalability is initiated. That is, the elasticity manager creates a new VM and has it initialized. When it is ready, it is added to the VMs that handle the load, and the load balancer will then automatically send many of the new requests to it thereafter because it will notice that the new VM has little load and it will try to level the load across all VMs.

Figure 4:
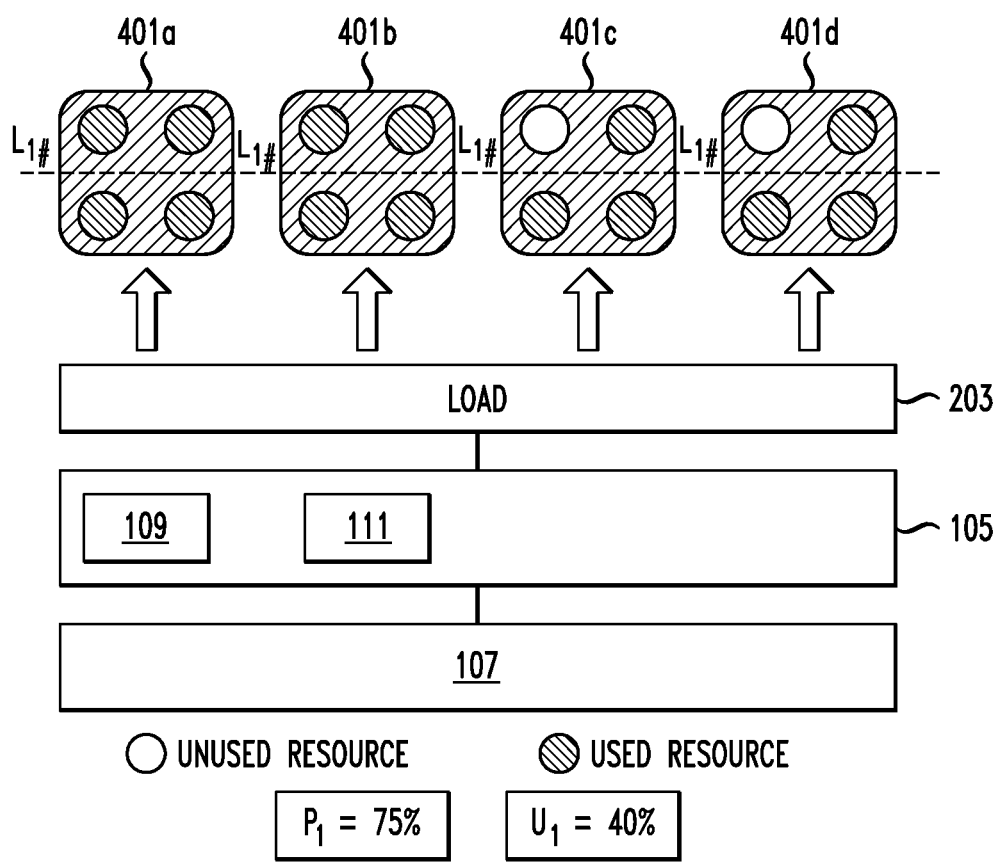
FIG. 4 is a schematic representation of a system according to an example.

FIG. 4 is a schematic representation of a system according to an example. In the example of FIG. 4, more than 75% of the VMs 401a-d have reached their $L_{T1}$ threshold. In the example shown, $U_1$=40%. As can be seen from FIG. 4, two of the VMs, 401a and 401b have reached their physical capacity limit. Accordingly, since this represents 50% of the VMs of the system 400 of FIG. 4, horizontal scalability is initiated.

Figure 5:
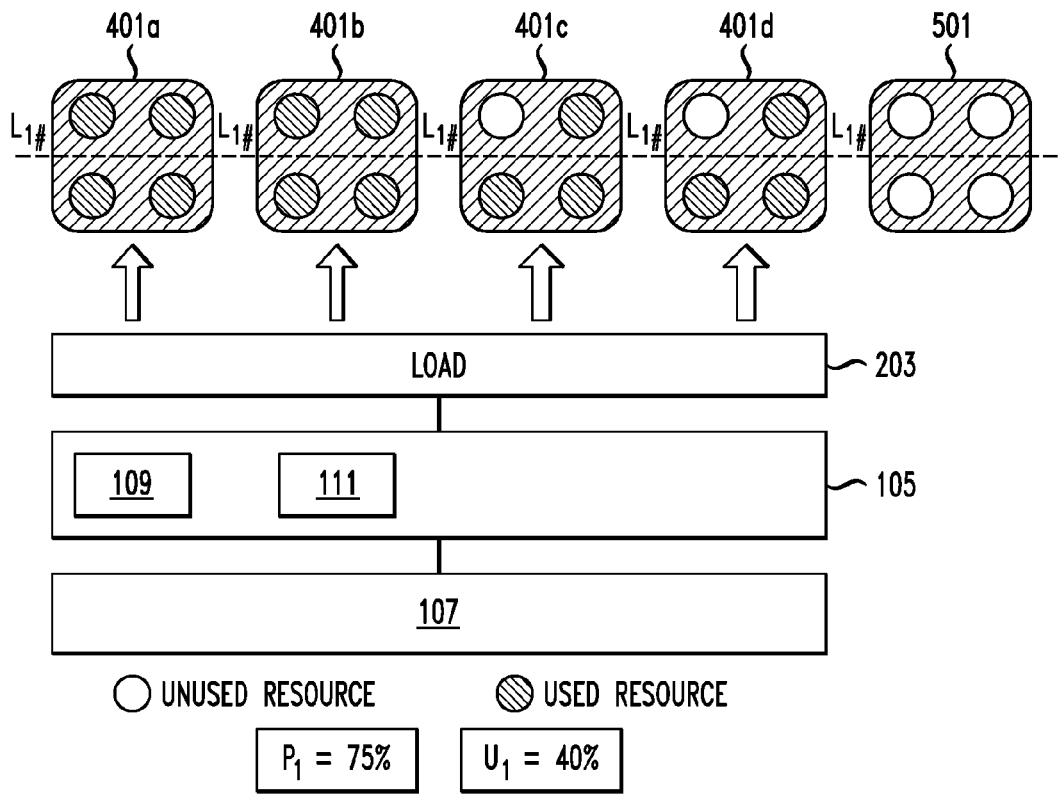
FIG. 5 is a schematic representation of a system according to an example.

FIG. 5 is a schematic representation of a system according to an example. In the example of FIG. 5, a new VM 501 has been instantiated using hypervisor 105. At the same time, as can be seen from the relative thickness of the arrows from the load to the VMs, the load balancer is sending more requests to VMs 401c and 401d, as these have spare capacity.

Figure 6:
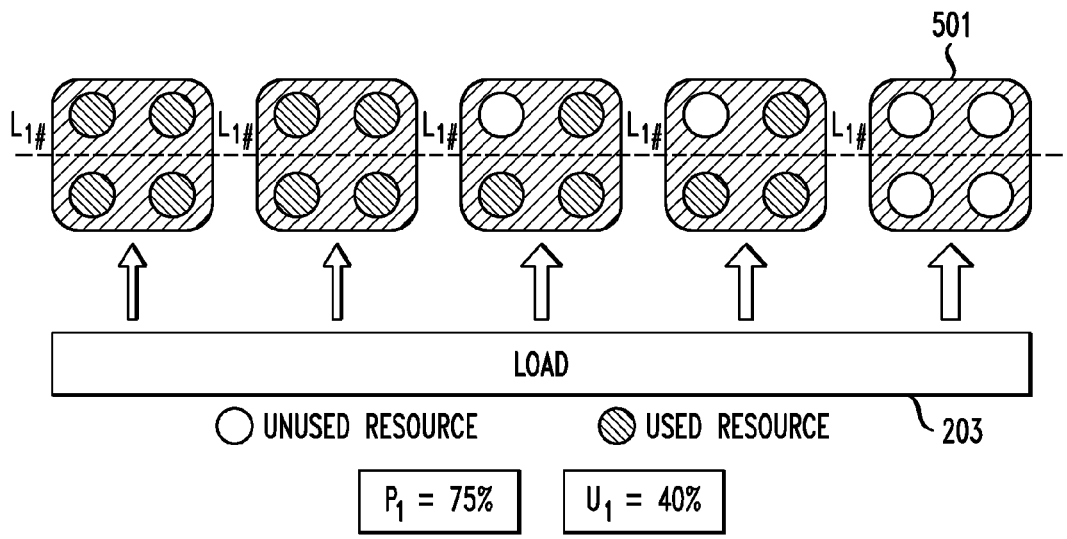
FIG. 6 is a schematic representation of a system according to an example.

FIG. 6 is a schematic representation of a system according to an example. In the example of FIG. 6, the new VM 501 is operational, and load balancer 109 therefore sends the bulk of requests relating to load 203 to new VM 501 as it has the most capacity of the multiple VMs of the system 600.

Concurrently, the elasticity manager 111 will continue with the following steps:
1. if there are VMs that have less resources than other VMs, the elasticity manager 111 will request that they increase their resources vertically; this is so that resources are added as evenly as possibly across all the VMs.
2. if there were no resources added in the previous step, the elasticity manager 111 instructs the VMs that have reached their limit to increase their resources vertically.
3. the elasticity manager 111 will then redistribute requests according to the new resource limits that each VM now has.

If a new VM is added as described above, and the average load on a VM falls below the $L_{T1}$ threshold, the elasticity manager 111 can request that one or more VMs downscale or reduce their resources so as to have more headroom to quickly and elastically upscale later, if required such as in the presence of an increased load. In an example, the or each VM selected for downscaling of resources is or are the VM(s) with the most unused resources and of size greater than the minimal size for a VM as noted above. In an example, downscaling does not go below the smallest VM size.

If the average load experienced by a system falls below a threshold, $L_{low}$, the elasticity manager 111 can reduce the number of VMs by selecting the VM with the least load, directing the load balancer 109 to stops sending requests to that VM. When the VM becomes idle, it is shut down (unless the load again increases, i.e., on a subsequent pass, if a new VM is needed, the selected VM can be reactivated). If a system supports migration of load, then the elasticity manager 111 can migrate the remaining load away from a VM if the VM takes too long to become idle, such as longer than a predefined period of time for example.

According to an example, after upscaling horizontally, the load rebalanced. This can result in vertical downscaling. That is, the vertical down scaling can be caused not only by a reduction in load but also in situations with increasing load that causes horizontal upscaling. In such a case, the down scaling is to "distribute" any surplus capacity across the VMs and downscale some of them so as to have more leeway to upscale rapidly in the face of future load increases.

Thus, according to an example, cloud services can provide much better elasticity, i.e., fit the resource to the demand much better. The degree of overprovisioning can be adapted to the desired ability to react to sudden increases in demand so the total amount of resources that the cloud service has available can be minimized. In an example, the extra overprovisioned resources are located horizontally across all VMs and each can therefore react quickly to increases in load. Each VM can quickly and elastically acquire more resource vertically, meaning that there are large amounts of resources that can be acquired quickly— typically orders of magnitude faster than if scaling out horizontally or activating a hot-standby virtual machine for example.

As used herein, the term virtual machine is not intended to be limiting. For example, a virtual machine can be in the form of an execution environment in the form of a container, or by way OS-level virtualization for example. That is, different isolated containers, or namespaces, or execution environments, residing in the same OS, but sufficiently isolated so that they are essentially executing in an exclusive OS environment can be used.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method, in a virtualized system, for balancing a load across multiple virtual machines (VMs) instantiated over physical hardware of the virtualized system, the method comprising:
   vertically scaling a capacity of one or more of the multiple VMs up to a physical capacity limit, $L_{PHY}$, from an initially allocated physical capacity, $L_{VIRT}$, by providing access to additional resources of the physical hardware in response to an increased load causing each of the one or more of the multiple VMs to reach or exceed a threshold capacity, $L_{T1}$, the threshold capacity $L_{T1}$ being less than the initially allocated physical capacity $L_{VIRT}$; and
   horizontally scaling the capacity of the virtualized system by supplementing the multiple VMs with an additional VM instantiated using a hypervisor of the virtualized system in response to (i) a threshold percentage, $P_1$, of the multiple VMs reaching or exceeding the threshold capacity $L_{T1}$ and (ii) a threshold percentage, $U_1$, of the multiple VMs reaching the physical capacity limit $L_{PHY}$, wherein $P_1$ and $U_1$ are greater than 0% and less than 100%, and $P_1$ is greater than $U_1$.

2. The method as claimed in claim 1, further comprising: distributing the increased load across the vertically scaled VMs to re-balance the load of the system.

3. The method as claimed in claim 1, further comprising: distributing the increased load across the horizontally scaled VMs to re-balance the load of the system.

4. The method as claimed in claim 1, further comprising: vertically downscaling the capacity of a selected VM in response to a reduction in the load or the horizontal scaling.

5. The method as claimed in claim 4, wherein the selected VM has,
   the most unused resources of the multiple VMs, and
   a physical capacity greater than $L_{VIRT}$.

6. The method as claimed in claim 4, wherein the selected VM is vertically downscaled after load re-balancing of the system.

7. The method as claimed in claim 1, further comprising: selecting an underutilized VM with the most unused resources of the multiple VMs;
   redirecting system requests to all other VMs but the underutilized VM to cause the underutilized VM to become an idle VM;
   if necessary, after a time period, migrating any remaining work away from the underutilized VM; and
   deactivating or deleting the idle VM.

8. A virtualized system including multiple virtual machines (VMs) in program execution on physical computing hardware supported by a hypervisor, respective VMs to execute multiple applications or application parts, the virtualized system including:
   a load balancer configured to,
      receive incoming requests, and
      distribute the incoming requests to selected ones of the multiple VMs; and an elasticity manager configured to,
      vertically scale a capacity of one or more of the multiple VMs up to a physical capacity limit, $L_{PHY}$, from an initially allocated physical capacity, $L_{VIRT}$, by providing access to additional resources of the physical hardware in response to an increased load causing each of the one or more of the multiple VMs to reach or exceed a threshold capacity, $L_{T1}$, the threshold capacity $L_{T1}$ being less than the initially allocated physical capacity $L_{VIRT}$, and
      horizontally scale the capacity of the virtualized system by supplementing the multiple VMs with an additional VM instantiated using the hypervisor in response to (i) a threshold percentage, $P_1$, of the multiple VMs reaching or exceeding the threshold capacity $L_{T1}$ and (ii) a threshold percentage, $U_1$, of the multiple VMs reaching the physical capacity limit, $L_{PHY}$, wherein $P_1$ and $U_1$ are greater than 0% and less than 100%, and $P_1$ is greater than $U_1$; and
      modify the receiving of the incoming requests and the distribution of the incoming requests by the load balancer according to a set of rules relating to multiple thresholds for individual and aggregate VM loads.

9. The system as claimed in claim 8, wherein the load balancer is configured to distribute the increased load across the vertically scaled VMs to re-balance the load of the system.

10. The system as claimed in claim 8, wherein the load balancer is configured to distribute the increased load across the horizontally scaled VMs to re-balance the load of the system.

11. The system as claimed in claim 8, wherein the elasticity manager is configured to reduce the physical capacity of a selected VM with a physical capacity greater than $L_{VIRT}$ in response to a reduction in the load or horizontal scaling.

12. The system as claimed in claim 8, wherein the elasticity manager is configured to determine whether a threshold physical capacity limit for the multiple VMs has been reached, and
   wherein the threshold physical capacity limit indicates whether the multiple VMs can be vertically scaled.

13. The system as claimed in claim 8, wherein the elasticity manager is configured to:
   select an underutilized VM with the most unused resources of the multiple VMs;
   redirect system requests to all other VMs but the underutilized VM to cause the underutilized VM to become an idle VM; and
   deactivate or delete the idle VM.

14. An elasticity manager for use in a virtualized system including multiple virtual machines (VMs) in program execution on physical computing hardware supported by a hypervisor, respective VMs configured to execute multiple applications or application parts, the elasticity manager comprising:

a memory having computer readable instructions stored therein, and a processor configured to execute the computer readable instructions to, vertically scale the capacity of one or more of the multiple VMs up to a physical capacity limit, $L_{PHY}$, from an initially allocated physical capacity, $L_{VIRT}$, by providing access to additional resources of the physical hardware in response to an increased load causing each of the one or more of the multiple VMs to reach or exceed a threshold capacity, $L_{T1}$, the threshold capacity $L_{T1}$ being less than the initially allocated physical capacity $L_{VIRT}$;

horizontally scale the capacity of the virtualized system by supplementing the multiple VMs with an additional VM instantiated using the hypervisor in response to (i) a threshold percentage, $P_1$, of the multiple VMs reaching or exceeding the threshold capacity $L_{T1}$ and (ii) a threshold percentage, $U_1$, of the multiple VMs reaching the physical capacity limit, $L_{PHY}$, wherein $P_1$ and $U_1$ are greater than 0% and less than 100%, and $P_1$ is greater than $U_1$; and control a load balancer according to a set of rules relating to multiple thresholds for individual and aggregate VM loads, the load balancer configured to, receive incoming requests, and distribute the incoming requests to selected ones of the VMs.

* * * * *